United States Patent
Weaver et al.

[15] 3,692,769
[45] Sept. 19, 1972

[54] AZO COMPOUNDS CONTAINING AN ARYLSULFONYL PHENYL DIAZO COMPONENT

[72] Inventors: Max A. Weaver, Route 8, Kingsport, Tenn. 37664; James M. Straley, Route 10, Kingsport, Tenn. 37663

[22] Filed: Feb. 18, 1970

[21] Appl. No.: 12,438

[52] U.S. Cl..................260/207.1, 8/41 C, 260/152, 260/155, 260/207
[51] Int. Cl. .....C09b 29/34, C09b 29/36, D06p 3/52
[58] Field of Search......260/152, 155, 205, 206, 207, 260/207.1; 8/41 C

[56] References Cited

UNITED STATES PATENTS

| | | | |
|---|---|---|---|
| 2,151,857 | 3/1939 | Manz et al. | 260/205 |
| 2,397,927 | 4/1946 | Dickey et al. | 260/207.1 X |
| 2,436,100 | 2/1948 | Dickey | 260/207 |
| 2,873,270 | 2/1959 | Merian | 260/205 |
| 2,967,858 | 1/1961 | Merian et al. | 260/205 |
| 3,359,256 | 12/1967 | Mueller et al. | 260/206 X |
| 3,398,137 | 8/1968 | Mueller | 260/207 |
| 3,406,164 | 10/1968 | Altermatt et al. | 260/207 |
| 3,417,076 | 12/1968 | Sartori | 260/205 |
| 3,428,622 | 2/1969 | Altermatt et al. | 260/207 |
| 3,483,180 | 12/1969 | Ramanathan | 260/158 |
| 2,529,924 | 11/1950 | Dickey | 260/155 |
| 2,746,952 | 5/1956 | Dickey et al. | 260/155 |
| 3,386,990 | 6/1968 | Dale et al. | 260/155 |

Primary Examiner—Floyd D. Higel
Attorney—J. Frederick Thomsen and Cecil D. Quillen, Jr.

[57] ABSTRACT

Azo compounds having the general formula

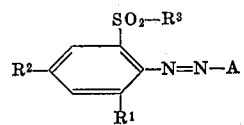

in which each of $R^1$ and $R^2$ is a conventional diazo component substituent or the group $-SO_2-R^3$, $R^3$ is an aryl group, and A is the residue of a disperse dye aniline or tetrahydroquinoline coupling component which bears an acylamido group on a ring carbon atom ortho to the azo group. The azo compounds produce reddish-blue to greenish-blue shades on polyester fibers and exhibit good dyeability, fastness to light and resistance to sublimation.

8 Claims, No Drawings

AZO COMPOUNDS CONTAINING AN ARYLSULFONYL PHENYL DIAZO COMPONENT

This invention relates to certain novel azo compounds and, more particularly, to certain azo compounds and to polyester textile materials dyed with the novel compounds.

The novel compounds of the invention have the formula (I)
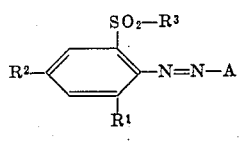

wherein $R^1$ is nitro, cyano, lower alkylsulfonyl, $R^3$—$SO_2$—, trifluoromethyl, lower alkoxycarbonyl, carbamoyl, lower alkylcarbamoyl, di-lower alkylcarbamoyl, sulfamoyl, lower alkylsulfamoyl or di-lower alkylsulfamoyl;

$R^2$ is nitro, cyano, lower alkylsulfonyl, lower alkoxycarbonyl, aroyl, carbamoyl, lower alkylcarbamoyl, di-lower alkylcarbamoyl, arylazo, or —$SO_2$—$R^3$;

$R^3$ is an aryl radical; and

A is a p-aminophenyl or 1,2,3,4-tetrahydroquinol-6-yl coupling component bearing an acylamido group ortho to the azo groups.

The novel azo compounds produce bright reddish-blue to greenish-blue shades on hydrophobic textile materials such as polyester fibers. The novel compounds possess excellent fastness to light and resistance to sublimation. The excellent dyeability properties, e.g. build-up and affinity, possessed by the novel compounds permits their application onto polyester fibers by either exhaustion, including atmospheric pressure, and thermal fixation dyeing techniques. As used herein to describe a group containing an alkyl moiety, lower designates a carbon content of up to about four carbon atoms.

The coupling components which, in formula (I), are represented by A have the formula

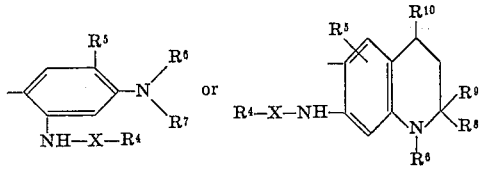

wherein X is —CO—, —COO—, or —$SO_2$—; $R^4$ is lower alkyl, cycloalkyl, aryl, lower alkylamino, di-lower alkylamino, or arylamino; $R^5$ is hydrogen, lower alkyl, lower alkoxy, aryloxy, lower alkylthio, or arylthio; $R^6$ is an alkyl radical having from one to about eight carbon atoms or cycloalkyl; $R^7$ is hydrogen or an alkyl radical which $R^6$ can represent, and $R^8$, $R^9$ and $R^{10}$ are the same or different and each is hydrogen or lower alkyl. Preferably, $R^8$ and $R^{10}$ each is hydrogen or methyl and both are hydrogen when $R^9$ is alkyl of two to four carbon atoms.

Methylsulfonyl, ethylsulfonyl, propylsulfonyl, n-butylsulfonyl, isobutylsulfonyl, methoxycarbonyl, ethoxycarbonyl, isopropoxycarbonyl, and butoxycarbonyl are typical alkylsulfonyl and alkoxycarbonyl groups represented by $R^1$ and $R^2$. Ethylcarbamoyl, butylcarbamoyl, dimethylcarbamoyl, diethylsulfamoyl, propylsulfamoyl and isobutylsulfamoyl are examples of the substituted carbamoyl and sulfamoyl groups represented by $R^1$ and $R^2$. The aryl groups represented by $R^3$ and $R^4$, the aryl moiety of the aroyl groups, i.e. arylcarbonyl, represented by $R^2$ and other aryl groups present on the novel azo compounds can be unsubstituted phenyl or phenyl bearing substituents such as lower alkyl, lower alkoxy, halogen, nitro, cyano, lower alkanoylamino or lower alkoxycarbonyl. Examples of such groups include phenyl, phenoxycarbonyl, p-tolyl, m-nitrophenyl, p-anisyl, o,p-dimethoxyphenyl, p-ethylphenyl, m-butylphenyl, p-cyanophenyl, p-methoxycarbonylphenyl, o,p-dichlorophenyl, o-bromo-p-tolyl, p-acetamidophenyl, p-butyramidophenyl, etc.

The lower alkyl groups represented by $R^4$ can be unsubstituted or substituted, for example, with halogen, phenyl, cyano, lower alkoxy, lower alkylsulfonyl, hydroxy, lower alkylthio, lower alkanoyloxy, etc. Cyclohexyl and lower alkylcyclohexyl are representative cycloalkyl groups represented by $R^4$. Methylamino, ethylamino, and butylamino are typical alkylamino groups which $R^4$ can represent. The aryl groups represented by $R^4$ and the aryl component of the arylamino groups represented by $R^4$ are defined hereinabove. Acetyl, propionyl, butyryl, cyanoacetyl, chloroacetyl, bromoacetyl, trifluoroacetyl, phenylacetyl, methoxyacetyl, ethylthioacetyl, methylsulfonylacetyl, methoxycarbonyl, propoxycarbonyl, butoxycarbonyl, methylsulfonyl, ethylsulfonyl, propylsulfonyl, butylsulfonyl, 2-cyanoethylsulfonyl, 2-methoxyethylsulfonyl, 2-chloroethylsulfonyl, cyclohexoyl, 4-ethylcyclohexoyl, benzoyl, 4-ethylbenzoyl, 3-nitrobenzoyl, 4-cyanobenzoyl, 4-ethoxycarbonylbenzoyl, phenoxycarbonyl, 2,4-dichlorophenoxycarbonyl, 4-bromophenoxycarbonyl, 4-acetamidophenoxycarbonyl, benzenesulfonyl, p-toluenesulfonyl, 4-propionamidophenylsulfonyl, 4-chlorophenylsulfonyl, cyclohexoxycarbonyl, 4-butylcyclohexylsulfonyl, ethylcarbamoyl, butylsulfamoyl, phenylcarbamoyl, p-tolylcarbamoyl, p-anisylcarbamoyl, and phenylsulfamoyl are typical groups represented by —X—$R^4$.

Examples of the alkyl and alkoxy groups which $R^5$ can represent are described in the preceding paragraphs. Phenoxy, p-tolyloxy, p-ethoxyphenoxy, methylthio, ethylthio, butylthio, phenylthio, m-acetamidophenylthio, p-chlorophenylthio and m-nitrophenylthio are typical aryloxy, alkylthio and arylthio groups represented by $R^5$. The alkyl radicals represented by $R^6$ and/or $R^7$ can be unsubstituted or substituted, straight- or branch-chain alkyl. Methyl, ethyl, propyl, isopropyl, butyl, isobutyl, hexyl, 2-ethylhexyl and 1,3-dimethylbutyl are typical unsubstituted alkyl groups. Examples of the substituents which can be present on those alkyl groups are hydroxy, cyano, lower alkoxy, lower cyanoalkoxy, dicarboximido, such as succinimido, glutarimido and phthalimido; aryl, aryloxy, and arylcarbamoyloxy in which the aryl groups are any of those described hereinabove; piperidono, pyrrolidinono, phthalimidino, cyclohexyl, lower alkylcyclohexyl, lower alkylcarbamoyloxy, carbamoyl, furyl, etc. The groups represented by $R^4$—X—, $R^4$—X—NH—, $R^4$—OOCO— and $R^4$—COO— also can be present on the alkyl groups represented by $R^6$ and $R^7$. The substituted alkyl groups preferably are substituted lower alkyl. Specific examples of the substituted alkyl groups which $R^6$ and/or $R^7$ can represent include 2-hydroxyethyl, 2,3-dihydroxypropyl, 3-chloro-2-hydroxypropyl, 2-bromoethyl, 3-chloropropyl, 2-cyanoethyl, 2-ethoxyethyl, 4-methoxybutyl, 2-(2-cyanoethoxy)ethoxy, 2-acetoxyethyl, 2,3-dipropionoxypropyl, 2-succinimidoethyl, 3-phthalimidopropyl, benzyl, 4-methoxycarbonylbenzyl, 2-(4-ethoxyphenyl)ethyl, 4-chlorobenzyl, 2-phenoxyethyl, 3-(4-acetamidophenoxy)propyl, 2-phenylcarbamoyloxyethyl, 2-(2-pyrrolidinono)ethyl, 3-(2-piperidono)propyl, 2-phthalimidinoethyl, 2-acetylethyl, 4-propionylbutyl, 2-ethoxycarbonylethyl, 2-carbamoylethyl, 3-isopropylcarbamoylpropyl, cyclohexylmethyl, 3-(3-ethylcyclohexyl)propyl, furfuryl, 2-methylsulfonylethyl, 2-sulfamoylethyl, 3-butylsulfamoylpropyl, 2-phenylsulfonylethyl, 2-(4-ethylbenzoyl)ethyl, 2-p-toloyloxyethyl, 2-acetamidoethyl, 2-methylsulfonamidoethyl, 3-benzamidopropyl, 2-ethoxycarbonyloxyethyl, 3-benzoyloxypropyl, etc. Cyclohexyl and lower alkylcyclohexyl are typical cycloalkyl groups which $R^6$ can represent.

Dyeings of excellent depth and having exceptional fastness properties on polyester fibers can be obtained economically with a compound having the general formula

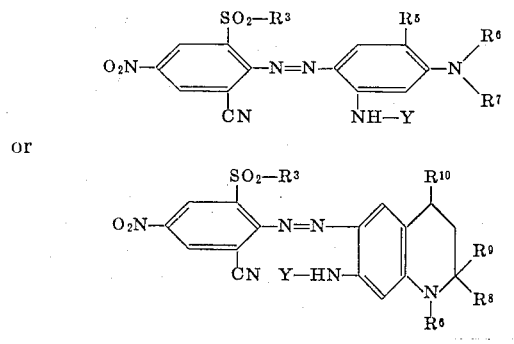

or wherein $R^3$ is phenyl, tolyl or anisyl; Y is lower alkanoyl, lower alkylsulfonyl, lower alkoxycarbonyl, benzoyl, or lower alkylcarbamoyl, $R^5$ is hydrogen, methyl, methoxy or ethoxy; $R^6$ is alkyl having one to about eight carbon atoms or lower alkyl substituted with hydroxy, lower alkoxy, lower alkanoyloxy, lower alkylsulfonyl, cyano, phenyl, lower alkanoylamino, lower alkoxycarbonylamino, or lower alkylsulfonamido; $R^7$ is hydrogen, alkyl having from one to about eight carbon atoms, or lower alkyl substituted with hydroxy, lower alkanoyloxy, or lower alkoxy; $R^8$ and $R^{10}$ each is hydrogen or methyl; and $R^9$ is hydrogen, methyl, or, when $R^8$ and $R^{10}$ each is hydrogen, alkyl of two to four carbon atoms. In addition to their excellent fastness properties, the desirable blue shade produced by these compounds also renders them particularly valuable polyester dyes.

The novel compounds are prepared by reacting a compound having the formula

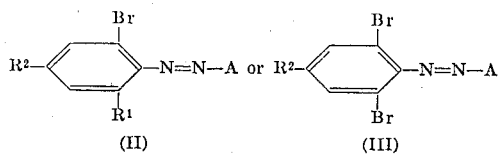

wherein $R^1$, $R^2$, and A are defined above except that $R^1$ cannot represent $R^3$—$SO_2$—, with a benzenesulfinic alkali salt having the formula $R^3$—$SO_2$—Z, wherein Z is sodium or potassium, in the presence of an inert solvent such as N,N-dimethylformamide. When $R^1$ is not nitro, reaction of an azo compound of formula (II) with $R^3$—$SO_2$—Z yields the corresponding compound in which the bromine atom is replaced with —$SO_2$—$R^3$. If $R^1$ is nitro, reaction of compound (II) with at least two equivalents of $R^3$—$SO_2$—Z gives the corresponding 2,6-di—$SO_2$—$R^4$ compound. The presence of a small amount of cuprous bromide in the reaction of a compound of formula (I), in which $R^1$ is nitro, produces the analagous 2-nitro-6-$SO_2$-$R^4$ compound. Completion of the displacement reaction and the structure of the azo product is established by thin-layer chromotography and/or elemental analysis. Some of the compounds of formulas (II) and (III) are known compounds. However, those known compounds do not possess the resistance to sublimation possessed by the novel compounds of the invention. The good yields in which the novel azo compounds can be synthesized is another desirable feature of applicants' compounds. Although certain known azo compounds having a 2-cyano-4,6-dinitrophenyl diazo component and coupling component A produce desirable blue shades on polyester fibers, such azo compounds cannot be obtained in good yields and/or purity. The azo compounds having formulas (II) and (III) can be prepared by diazotizing an aniline compound having the formula

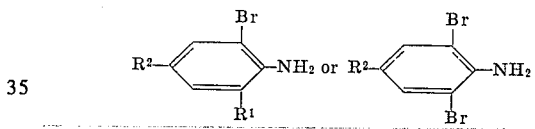

and coupling the resulting diazonium salt to a coupler having the formula H—A according to conventional procedures. The aniline compounds and the couplers are known and/or can be synthesized according to known techniques.

The novel azo compounds and their preparation and use are further illustrated by the following examples.

EXAMPLE 1

The azo compound 4-(2-bromo-6-nitro-4-nitrophenylazo)-N-cyclohexyl-N-ethyl-3-acetamidoaniline (1.0 g.), sodium benzenesulfinate (0.5 g.) and N,N-dimethylformamide (25 ml.) are heated together on a steam bath for 20 minutes. The reaction mixture is drowned in water and the product is filtered off, washed with water and air dried. The azo compound obtained, 4-(2-cyano-4-nitro-6-phenylsulfonylphenylazo)-N-cyclohexyl-N-ethyl-3-acetamidoaniline, produces bright shades having excellent fastness on polyester fibers.

EXAMPLE 2

The procedure described in Example 1 is repeated using 0.8 g. of 4-(2-bromo-6-cyano-4-nitrophenylazo)-N,N-diethyl-3-acetamidoaniline, 0.3 g. sodium benzenesulfinate, and 15 ml. dimethylformamide. The blue azo compound obtained, 4-(2-cyano-4-nitro-6-phenylsulfonylphenylazo)-N,N-diethyl-3-acetamidoaniline, exhibits outstanding fastness to light and resistance to sublimation when applied to cotton-polyester blends by the heat fixation dyeing technique.

EXAMPLE 3

1.35 g. 4-(2-Bromo-4,6-dinitrophenylazo)-N-benzyl-N-ethyl-3-acetamidoaniline, 0.55 g. sodium benzenesulfinate, and 15 ml. dimethylformamide are heated together on a steam bath for about 20 minutes. A sample of the reaction mixture reveals two products, indicating that both the ortho-nitro and orthobromo groups are being displaced. Upon addition of 0.55 g. additional sodium benzenesulfinate and heating for another hour, only one product is obtained. This azo compound, 4-(4-nitro-2,6-diphenylsulfonylphenylazo)-N-benzyl-N-ethyl-3-acetamidoaniline, produces a blue shade on polyester fibers.

Anal. Calcd. for $C_{35}H_{31}N_5O_7S_2$: S, 9.19; N, 10.04
Found: S, 9.19; N, 9.80

EXAMPLE 4

1.0 g. of 4-(2-Bromo-4,6-dinitrophenylazo)-N,β-benzoyloxyethyl-N-ethyl-3-acetamidoaniline, 0.32 g. sodium benzenesulfonate, 0.1 g. cuprous bromide and 25 ml. dimethylformamide are heated for 30 minutes on a steam bath. The reaction mixture is drowned in water and the product is filtered off, washed with water and air dried. The azo product, 4-(2,4-dinitro-6-phenylsulfonylphenylazo)-N,β-benzoyloxyethyl-N-ethyl-3-acetamidoaniline, produces fast blue shades on polyester fibers.

EXAMPLE 5

A mixture of the azo compound 6-(2-bromo-6-cyano-4-nitrophenylazo)-N,βacetoxyethyl-7-acetamido-2,2,4-trimethyl-1,2,3,4-tetrahydroquinoline (0.4 g.), sodium benzenesulfinate (0.2 g.), and dimethylformamide (15 ml.) is heated on a steam bath (95°–100°C.) for 20 minutes. The resulting azo compound, 6-(2-cyano-4-nitro-6-phenylsulfonylphenylazo)-N,βacetoxyethyl-7-acetamido-2,2,4-trimethyl-1,2,3,4-tetrahydroquinoline, produces bright blue shades exhibiting excellent fastness properties on polyester fibers.

EXAMPLE 6

The procedure of Example 5 is repeated using 1.0 g. of 6-(2-bromo-6-cyano-4-nitrophenylazo)-7-acetamido-N,β-benzoyloxyethyl-2,2,4-trimethyl-1,2,3,4-tetrahydroquinoline, 0.5 g. sodium benzenesulfinate, and 25 ml. of dimethylformamide. The azo compound obtained, 6-(2-cyano-4-nitro-6-phenylsulfonylphenylazo)-7-acetamido-N,β-benzoyloxyethyl-2,2,4-trimethyl-1,2,3,4-tetrahydroquinoline produces blue shades and exhibits excellent light- and sublimation-fastness on polyester fibers.

The azo compounds described in Tables I and II are prepared according to the procedures described in Examples 1 through 6. The azo compounds of Table I conform to the general formula

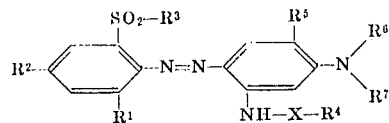

and those of Table II conform to the formula

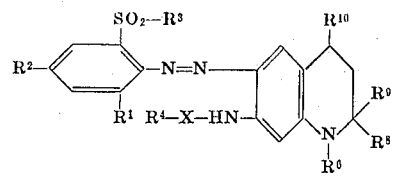

The compounds disclosed in the Examples of Tables I and II produce bright shades of reddish- to greenish-blue on polyester fibers.

The compounds of the invention can be applied to linear polyester textile materials in accordance with known disperse dyeing procedures using auxiliary dyeing agents such as surfactants, dispersing agents, carriers, thickeners, etc. The dyeing can be carried out at the boil at atmospheric pressure or at higher temperatures under a pressure moderately above atmospheric pressure. The following example illustrates a carrier dyeing procedure for applying the azo compounds of the invention to polyester textile materials.

EXAMPLE 183

The azo compound of Example 11 (0.1 g.) is dissolved in 10 cc. of 2-methoxyethanol. A small amount (3–5 cc.) of a 3 percent sodium lignin sulfonate aqueous solution is added, with stirring, and then the volume of the bath is brought to 300 cc. with water. 3 cc. of a solvent carrier (Tanavol) is added to the bath and 10 g. of a textile fabric made of poly(ethylene terephthalate) fibers is placed in the bath and worked 10 minutes without heat. The dyeing is carried out at the boil for one hour. The dyed fabric is removed from the dyebath and scoured for 20 minutes at 80°C. in a solution containing 1 g./l. neutral soap and 1 g./l. sodium carbonate. The fabric is then rinsed, dried in an oven at 250°F. and heat set (for removal of residual carrier) for 5 minutes at 350°C. The fabric is a bright shade of blue which exhibits excellent fastness to light.

The compounds of the invention can also be applied to polyester textile materials by the heat fixation technique described in U.S. Pat. No. 2,663,612 and in the American Dyestuff Reporter, 42, 1 (1953). The following procedure describes how the azo compounds of the invention can be applied to polyester materials by the heat fixation technique.

EXAMPLE 184

A mixture of:

500 mg. of the compound of Example 9, 150 mg. of a sodium lignosulfonate dispersing agent (Marasperse N), 150 mg. of a partially desulfonated sodium lignosulfonate (Marasperse CB), 0.5 ml. glycerin, and 1.0 ml. of water is ground in a micro-size container (an accessory for a 1-quart size Szegvari Attritor) for approximately 3.5 hours. Enough ⅛-inch stainless steel balls are added to provide maximum grinding. When the grinding is complete, the entire contents are poured into a beaker and 100 ml. of water are used to wash the remaining dye paste from the micro-container. The dye paste is then heated slowly to 65°C. with continuous stirring. A thickener and penetrating mixture is prepared by mixing 1 ml. of a complex diaryl sulfonate (Compound 8-S), 3 ml. of a 3 percent solution of a sodium N-methyl-N-oleoyl-taurate (Igepon T-S1), 8

TABLE I

| Example number | R¹ | R² | R³ | | X | R⁴ | R⁵ | R⁶ | R⁷ |
|---|---|---|---|---|---|---|---|---|---|
| 7 | CN | —NO₂ | —C₆H₅ | | —CO— | —CH₃ | H | —CH₂CH(OH)CH₃ | —(CH₂)₃CH₃ |
| 8 | CN | —NO₂ | —C₆H₅ | | —CO— | —CH₃ | H | —CH₂CH₂OCCH₃ | —C₂H₅ |
| 9 | CN | —NO₂ | —C₆H₅ | | —CO— | —CH₃ | —CH₃ | —CH₂CH₂OH | —CH₂CH₂OH |
| 10 | CN | —NO₂ | —C₆H₅ | | —CO— | —CH₃ | H | —C₅H₁₁ | —CH₂CH(CH₃)₂ |
| 11 | CN | —NO₂ | —C₆H₅ | | —CO— | —CH₃ | H | —CH₂CH(OH)CH₂OH | —C₂H₅ |
| 12 | CN | —NO₂ | —C₆H₅ | | —CO— | —CH₃ | H | —CH₂CH₂OCH₃ | —C₂H₅ |
| 13 | CN | —NO₂ | —C₆H₅ | | —CO— | —CH₃ | H | —CH₂CH₂OCOC₂H₅ | —C₂H₅ |
| 14 | CN | —NO₂ | —C₆H₅ | | —CO— | —CH₃ | H | —CH₂CH₂OOCCH₃ | —C₂H₅ |
| 15 | CN | —NO₂ | —C₆H₅ | | —CO— | —CH₃ | H | —CH₂CH₂NHCOCH₃ | —C₂H₅ |
| 16 | CN | —NO₂ | —C₆H₅ | | —CO— | —CH₃ | H | —(CH₂)₃NHCOC₂H₅ | —C₂H₅ |
| 17 | CN | —NO₂ | —C₆H₅ | | —CO— | —CH₃ | H | —CH₂CH₂NHSO₂CH₃ | —C₂H₅ |
| 18 | CN | —NO₂ | —C₆H₅ | | —CO— | —CH₃ | H | —CH₂CH₂NHCOCH₂OCH₃ | —C₂H₅ |
| 19 | CN | —NO₂ | —C₆H₅ | | —CO— | —CH₃ | H | —CH₂CH₂OOCCH₂OCH₃ | —C₂H₅ |
| 20 | CN | —NO₂ | —C₆H₄—p-OCH₃ | | —CO— | —CH₃ | H | —CH₂CH₂OH | —C₂H₅ |
| 21 | CN | —NO₂ | —C₆H₄—p-CH₃ | | —CO— | —CH₃ | H | —CH₂CH₂OH | —C₂H₅ |
| 22 | CN | —NO₂ | —C₆H₄—p-Cl | | —CO— | —CH₃ | H | —CH₂CH₂OH | —CH₂CH₂OH |
| 23 | CN | —NO₂ | —C₆H₄—p-NHCOCH₃ | | —CO— | —CH₃ | H | —CH₂CH₂OH | —CH₂CH₂OH |
| 24 | CN | —NO₂ | —C₆H₄—o-Cl | | —CO— | —CH₃ | H | —CH₂CH₂OH | —CH₂CH₂OOCCH₃ |
| 25 | CN | —NO₂ | —C₆H₅ | | —CO— | —CH₃ | H | —CH₂CH₂OCH₃ | —CH₂CH₂OOCCH₃ |
| 26 | CN | —NO₂ | —C₆H₅ | | —CO— | —CH₃ | H | —CH₂CH₂OOCCH₃ | —CH₂CH(CH₃)₂ |
| 27 | CN | —NO₂ | —C₆H₅ | | —CO— | —CH₃ | H | —CH₂CH(OH)CH₂OH | —CH₂CH(CH₃)₂ |
| 28 | CN | —NO₂ | —C₆H₅ | | —CO— | —CH₃ | H | —CH(CH₃)CH₂OCH₃ | —C₂H₅ |
| 29 | CN | —NO₂ | —C₆H₅ | | —CO— | —CH₃ | H | —CH(CH₃)CH₂—p-COOCH₃ | —C₂H₅ |
| 30 | CN | —NO₂ | —C₆H₅ | | —CO— | —CH₃ | H | —C₆H₅ | —C₂H₅ |
| 31 | CN | —NO₂ | —C₆H₅ | | —CO— | —CH₃ | H | —CH₂C₆H₅ | —C₂H₅ |
| 32 | CN | —NO₂ | —C₆H₅ | | —CO— | —C₅H₁₁ | H | —CH₂CH₂OH | —CH(CH₃)CH₂CH₃ |
| 33 | CN | —NO₂ | —C₆H₅ | | —CO— | —CH₃ | H | —CH₂CH₂OOCOC₂H₅ | —CH₂CH₂OOCCH₃ |
| 34 | CN | —NO₂ | —C₆H₅ | | —CO— | —CH₃ | H | —CH₂CH₂CONHC₂H₅ | —C₂H₅ |
| 35 | CN | —NO₂ | —C₆H₅ | | —CO— | —CH₃ | H | —CH₂CH₂CONH₂ | —C₂H₅ |
| 36 | CN | —NO₂ | —C₆H₅ | | —CO— | —CH₃ | H | —CH₂CH₂CN | —CH(CH₃)CH₂CH₃ |
| 37 | CN | —NO₂ | —C₆H₅ | | —CO— | —CH₃ | H | —CH₂CH₂OOCCH₃ | —CH₂CH₂OOCCH₃ |
| 38 | CN | —NO₂ | —C₆H₅ | | —CO— | —CH₃ | H | —CH₂CH₂OC₆H₅ | —C₂H₅ |
| 39 | CN | —NO₂ | —C₆H₅ | | —CO— | —CH₃ | H | —(CH₂)₃SO₂CH₃ | —C₂H₅ |
| 40 | CN | —NO₂ | —C₆H₅ | | —CO— | —CH₃ | H | —CH₂CH₂OOCC(CH₃)₂OOCCH(CH₃) | —CH(C₂H₅)(CH₂)₄CH₃ |
| 41 | CN | —NO₂ | —C₆H₅ | | —CO— | —CH₃ | H | —(CH₂)₂OCH₃ | —(CH₂)₃OCH₃ |
| 42 | CN | —NO₂ | —C₆H₅ | | —CO— | —C₂H₅ | H | —C₂H₅ | —C₂H₅ |
| 43 | CN | —NO₂ | —C₆H₅ | | —CO— | —C₂H₅ | H | —CH₂CH₂OC₂H₅ | —C₂H₅ |
| 44 | CN | —NO₂ | —C₆H₅ | | —CO— | —CH₃ | H | —C₂H₅ | —C₆H₁₃ |
| 45 | CN | —NO₂ | —C₆H₅ | | —CO— | —CH₃ | H | —CH₂CH₂OOCCH₃ | —CH₂CH(CH₃)₂ |
| 46 | CN | —NO₂ | —C₆H₅ | | —CO— | —NHC₆H₅ | H | —CH₂CH₂CONH₂ | —CH₂CH(CH₃)₂ |
| 47 | CN | —NO₂ | —C₆H₅ | | —SO₂— | —CH₃ | H | —C₂H₅ | —C₂H₅ |
| 48 | CN | —NO₂ | —C₆H₅ | | —SO₂— | —C₆H₁₁ | H | —CH₂CH₂OC₂H₅ | —C₂H₅ |
| 49 | CN | —NO₂ | —C₆H₅ | | —CO— | —C₆H₁₁—p-OCH₃ | H | —CH₂CH₂OOCCH₃ | —C₂H₅ |
| 50 | CN | —NO₂ | —C₆H₅ | | —CO— | —CH₂CN | H | —CH₂CH₂CN | —C₂H₅ |
| 51 | CN | —NO₂ | —C₆H₅ | | —CO— | —CH₂C₆H₅ | H | —CH₂CH₂OCCH₃ | —C₂H₅ |
| 52 | CN | —NO₂ | —C₆H₅ | | —CO— | —CH₂SCH₃ | H | —CH₂CH₂OC₂H₅ | —C₂H₅ |
| 53 | CN | —NO₂ | —C₆H₅ | | —CO— | —CH₂CH₂COCH₃ | H | —CH₂CH₂OCH₃ | —C₂H₅ |
| 54 | CN | —NO₂ | —C₆H₅ | | —CO— | —N(CH₃)₂ | H | —CH₂CH₂OOCCH₃ | —C₂H₅ |
| 61 | CN | —NO₂ | —C₆H₅ | | —CO— | —C=CH—CH=CH—O— | H | —C₂H₅ | —C₂H₅ |
| 62 | CN | —NO₂ | —C₆H₅ | | —CO— | —CH₃ | —CH₃ | —CH₂CH₂OC₂H₅ | —C₂H₅ |
| 63 | CN | —NO₂ | —C₆H₅ | | —CO— | —CH₃ | —CH₃ | —CH(CH₃)CH₂CH₃ | —C₂H₅ |
| 64 | CN | —NO₂ | —C₆H₅ | | —CO— | —CH₃ | —SCH₃ | —CH(C₂H₅)(CH₂)₃CH₃ | —C₂H₅ |
| 65 | CN | —NO₂ | —C₆H₅ | | —CO— | —NHC₂H₅ | —CH₃ | —CH₂C₂H₅ | —C₂H₅ |
| 66 | CN | —NO₂ | —C₆H₅ | | —CO— | —CH₃ | —OCH₃ | —CH₂CH₂OOCCH₃ | —C₂H₅ |
| 67 | CN | —NO₂ | —C₆H₅ | | —CO— | —CH₃ | —OCH₃ | —CH₂CH₂CN | —C₂H₅ |
| 68 | CN | —NO₂ | —C₆H₅ | | —CO— | —CH₃ | —OCH₃ | —CH₂CH₂OCH₂CH₂CN | —C₂H₅ |
| 69 | CN | —NO₂ | —C₆H₅ | | —CO— | —CH₃ | —OCH₃ | —CH₂CH₂OOCCH₃ | —CH₂CH₂OOCCH₃ |
| 70 | CN | —NO₂ | —C₆H₅ | | —CO— | —CH₃ | —OCH₃ | —CH₂CH₂CONH₂ | —CH₂CH₂OOCCH₃ |
| 71 | CN | —NO₂ | —C₆H₅ | | —CO— | —CH₃ | —OCH₃ | —CH₂CH₂OCCH₃ | H |
| 72 | CN | —NO₂ | —C₆H₅ | | —CO— | —CH₃ | —OCH₃ | —CH₂CH₂OOCCH₃ | H |
| 73 | CN | —NO₂ | —C₆H₅ | | —CO— | —CH₃ | —OCH₃ | —CH₂CH₂OOCCH₃ | —C₂H₅ |
| 74 | CN | —NO₂ | —C₆H₅ | | —CO— | —CH₃ | —OCH₃ | —CH₂CH₂OOCCH₃ | —CH₂CH₂OOCOCH₃ |

Table I—Continued

| Example number | R¹ | R² | R³ | X | R⁴ | R³ | R⁶ | R⁷ |
|---|---|---|---|---|---|---|---|---|
| 75 | CN | —NO₂ | —C₆H₅ | —CO— | —CH₃ | —OCH₃ | —CH₂CH₂OOCC₆H₅ | H |
| 76 | CN | —NO₂ | —C₆H₅ | —CO— | —CH₃ | —OCH₃ | —CH₂CH₂OCH₃ | —CH₂CH(CH₃)₂ |
| 77 | CN | —NO₂ | —C₆H₅ | —CO— | —CH₃ | —OCH₃ | —CH₂CH₂OCH₃ | —CH₂CH₂OCH₃ |
| 78 | CN | —NO₂ | —C₆H₅ | —CO— | —CH₃ | —OCH₃ | —C₂H₅ | —CH₂CH(CH₃)₂ |
| 79 | CN | —NO₂ | —C₆H₅ | —CO— | —CH₃ | —OCH₃ | —CH₂CH(OH)CH₂OH | H |
| 80 | CN | —NO₂ | —C₆H₅ | —CO— | —CH₃ | —OCH₃ | —CH₂CH₂OH | —CH₂CH₂OH |
| 81 | CN | —NO₂ | —C₆H₅ | —CO— | —CH₃ | —OCH₃ | —CH₂CH₂OH | —CH₂CH(CH₃) |
| 82 | CN | —NO₂ | —C₆H₅ | —CO— | —CH₃ | —OCH₃ | —CH₂CH₂OH | —CH₂CH(CH₃) |
| 83 | CN | —NO₂ | —C₆H₅ | —CO— | —CH₃ | —OCH₃ | —CH₂C₆H₅ | —CH₂CH₂OH |
| 84 | CN | —NO₂ | —C₆H₅ | —CO— | —CH₃ | —OCH₃ | —CH₂—C=CH—CH=CH—O | H |
| 85 | CN | —NO₂ | —C₆H₅ | —CO— | —CH₃ | —OCH₃ | —CH₂CH(CH₃)₂ | H |
| 86 | CN | —NO₂ | —C₆H₅ | —CO— | —CH₃ | —CH₃ | —CH(CH₃)CH₂CH₃ | H |
| 87 | CN | —NO₂ | —C₆H₅ | —CO— | —CH₃ | —OCH₃ | —CH(CH₃)CH₂CH₃ | H |
| 88 | CN | —NO₂ | —C₆H₅ | —CO— | —CH₃ | —OCH₃ | —(CH₂)₃CH₃ | H |
| 89 | CN | —NO₂ | —C₆H₅ | —CO— | —CH₃ | —OCH₃ | —C₆H₁₁ | H |
| 90 | CN | —NO₂ | —C₆H₅ | —CO— | —CH₃ | —OCH₃ | —C₂H₄C₆H₁₁ | H |
| 91 | CN | —NO₂ | —C₆H₅ | —CO— | —CH₃ | —OCH₃ | —CH₂CH₂N(CH₃)SO₂CH₃ | H |
| 92 | CN | —NO₂ | —C₆H₅ | —CO— | —CH₃ | —OCH₃ | —CH₂CH₂COOCH₃ | H |
| 93 | CN | —NO₂ | —C₆H₅ | —CO— | —CH₃ | —OCH₃ | —CH(CH₃)(CH₂)₂ | —C₂H₅ |
| 94 | CN | —NO₂ | —C₆H₅ | —CO— | —CH₃ | H | —H | H |
| 95 | CN | —NO₂ | —C₆H₅ | —CO— | —CH₃ | —OCH₃ | —C₂H₅ | —C₂H₅ |
| 96 | SO₂CH₃ | —NO₂ | —C₆H₅ | —CO— | —CH₃ | —OCH₃ | —C₆H₁₁ | H |
| 97 | COOC₂H₅ | —NO₂ | —C₆H₅ | —CO— | —CH₃ | —OCH₃ | —CH(CH₃)CH₂CH₃ | H |
| 98 | CON(CH₃) | —NO₂ | —C₆H₅ | —CO— | —CH₃ | —OCH₃ | —CH(CH₃)CH₂CH₃ | H |
| 99 | SO₂N(C₂H₅)₂ | —NO₂ | —C₆H₅ | —CO— | —CH₃ | —OCH₃ | —CH(CH₃)CH₂CH₃ | H |
| 100 | CF₃ | —NO₂ | —C₆H₅ | —CO— | —CH₃ | —OCH₃ | —CH(CH₃)CH₂CH₃ | H |
| 101 | SO₂C₆H₅ | —NO₂ | —C₆H₅ | —CO— | —CH₃ | —OCH₃ | —CH(CH₃)CH₂CH₃ | H |
| 102 | CN | —CN | —C₆H₅ | —CO— | —CH₃ | —OCH₃ | —CH(CH₃)CH₂CH₃ | H |
| 103 | CN | —SO₂CH₃ | —C₆H₅ | —CO— | —CH₃ | —OCH₃ | —CH(CH₃)CH₂CH₃ | H |
| 104 | CN | —COOC₂H₅ | —C₆H₅ | —CO— | —CH₃ | —OCH₃ | —CH(CH₃)CH₂CH₃ | H |
| 105 | CN | —COC₆H₅ | —C₆H₅ | —CO— | —CH₃ | —OCH₃ | —CH(CH₃)CH₂CH₃ | H |
| 106 | CN | —CON(CH₃)₂ | —C₆H₅ | —CO— | —CH₃ | —OCH₃ | —CH(CH₃)CH₂CH₃ | H |
| 107 | CN | —SO₂N(CH₃)₂ | —C₆H₅ | —CO— | —CH₃ | —OCH₃ | —CH(CH₃)₂(CH₂)₂CH₃ | H |
| 108 | CN | —NO₂ | —C₆H₅ | —CO— | —CH₃ | —OCH₃ | —CH₂CH₂NCOCH₂CH₂CO | H |
| 109 | —CN | —NO₂ | —C₆H₅ | —CO— | —CH₃ | —OCH₃ | —CH₂CH₂NCO—o-C₆H₄—CO | H |
| 110 | —CN | —NO₂ | —C₆H₅ | —CO— | —CH₃ | —OCH₃ | | H |

TABLE II

| Example number | R¹ | R² | R⁵ | X | R⁴ | R³, R⁸, R⁹, R¹⁰ | R⁶ |
|---|---|---|---|---|---|---|---|
| 111 | —CN | —NO₂ | —C₆H₅ | —CO— | —CH₃ | 2,2,4-tri-CH₃ | —CH₂CH₂OC₂H₅ |
| 112 | —SO₂C₆H₅ | —NO₂ | —C₆H₅ | —CO— | —CH₃ | 2,2,4-tri-CH₃ | —C₂H₅ |
| 113 | —CN | —NO₂ | —C₆H₅ | —CO— | —CH₃ | 2,2,4-tri-CH₃ | —CH₂CH₂CH₃ |
| 114 | —CN | —NO₂ | —C₆H₄—p-OCH₃ | —CO— | —CH₃ | 2,2,4-tri-CH₃ | —C₂H₅ |
| 115 | —CN | —NO₂ | —C₆H₄—p-CH₃ | —CO— | —CH₃ | 2,2,4-tri-CH₃ | —CH(CH₃)CH₂CH₃ |
| 116 | —CN | —NO₂ | —C₆H₄—p-Cl | —CO— | —CH₃ | 2,2,4-tri-CH₃ | —C₂H₅ |
| 117 | —CN | —NO₂ | —C₆H₄—p-NHCOCH₃ | —CO— | —C₂H₅ | 2-CH₃ | —CH₂CH₂OOCCH₃ |
| 118 | —CN | —NO₂ | —C₆H₄—m-CH₃ | —COO— | —C₂H₅ | 2,2,4-tri-CH₃ | —C₂H₅ |
| 119 | —CN | —NO₂ | —C₆H₄—o-NO₂ | —CO— | —CH₂OH | H | —C₂H₅ |
| 120 | —CN | —NO₂ | —C₆H₄—o,p-Cl | —CO— | —CH₂C₆H₅ | 2-CH(CH₃)₂ | —CH₂CH₂OOCCH₃ |
| 121 | —CN | —NO₂ | —C₆H₅ | —CO— | —C₆H₁₁ | 2,2,4-tri-CH₃ | —CH₂CH₂OOCCH₃ |
| 122 | —CN | —NO₂ | —C₆H₅ | —CO— | —C₆H₅ | 2,2,4-tri-CH₃ | —CH₂CH₂OOCCH₃ |
| 123 | —CN | —NO₂ | —C₆H₅ | —CO— | —CH₃ | 2,2,4-tri-CH₃ | —CH₂CH₂OOCCH₃ |
| 124 | —CN | —NO₂ | —C₆H₅ | —CO— | —CH₂CN | 2,2,4-tri-CH₃ | —CH₂CH₂OOCC₂H₅ |
| 125 | —CN | —NO₂ | —C₆H₅ | —CO— | —CH₂OCH₃ | 2,2,4-tri-CH₃ | —CH₂CH₂OCH₃ |
| 126 | —CN | —NO₂ | —C₆H₅ | —CO— | —CH₃ | 2,2,4-tri-CH₃ | —C₂H₅ |
| 127 | —CN | —NO₂ | —C₆H₅ | —SO₂— | —C₆H₅ | 2,2,4-tri-CH₃ | —C₂H₅ |
| 128 | —CN | —NO₂ | —C₆H₅ | —SO₂— | —CH₃ | 2,2,4-tri-CH₃ | —C₂H₅ |
| 129 | —CN | —NO₂ | —C₆H₅ | —CO— | —NHC₂H₅ | 2,2,4-tri-CH₃ | —C₂H₅ |
| 130 | —CN | —NO₂ | —C₆H₅ | | | 2,2,4-tri-CH₃ | —C₂H₅ |
| 131 | —CN | —NO₂ | —C₆H₅ | | | 2,2,4-tri-CH₃ | —C₂H₅ |

Table II—Continued

| Example number | R¹ | R² | R³ | X | R⁴ | R⁵, R⁷, R⁸, R⁹, R¹⁰ | R⁶ |
|---|---|---|---|---|---|---|---|
| 132 | —CN | —NO₂ | —C₆H₅ | —CO— | —NHC₆H₅ | 2,2,4-tri-CH₃ | —C₂H₅ |
| 133 | —CN | —NO₂ | —C₆H₅ | —SO₂— | —N(CH₃)₂ | 2,2,4-tri-CH₃ | —C₂H₅ |
| 134 | —CN | —NO₂ | —C₆H₅ | —CO— | —CH₂NCOCH₂CH₂CO | 2,2,4-tri-CH₃ | —C₂H₅ |
| 135 | —CN | —NO₂ | —C₆H₅ | —CO— | —CH₂N(CH₃)SO₂CH₃ | 2,2,4-tri-CH₃ | —C₂H₅ |
| 136 | —CN | —NO₂ | —C₆H₅ | —CO— | —CH₂SO₂C₆H₅ | 2,2,4-tri-CH₃ | —CH₂CH₂OOCCH₃ |
| 137 | —CN | —NO₂ | —C₆H₅ | —CO— | —CH₂NHCOCH₃ | 2,2,4-tri-CH₃ | —CH₂CH₂OOCCH₃ |
| 138 | —CN | —NO₂ | —C₆H₅ | —CO— | —C₅H₁₁ | 2,2,4-tri-CH₃ | —CH₂CH₂OOCCH₃ |
| 139 | —CN | —NO₂ | —C₆N₅ | —COO— | —CH₂C₆H₅ | 2,2,4-tri-CH₃ | —CH₂CH₂OOCCH₃ |
| 140 | —CN | —NO₂ | —C₆H₅ | —CO— | —CH₃ | 8-OCH₃-2,2,4,5,7-penta-CH₃ | —C₂H₅ |
| 141 | —CN | —NO₂ | —C₆H₅ | —CO— | —CH₃ | 2,2,4,5,7-penta-CH₃ | —C₂H₅ |
| 142 | —CN | —NO₂ | —C₆H₅ | —CO— | —CH₃ | 2,2,4-tri-CH₃ | —CH₂CH₂OCH₂CH₂CN |
| 143 | —CN | —NO₂ | —C₆H₅ | —CO— | —CH₃ | 2,2,4-tri-CH₃ | —CH₂CH₂CONH₂ |
| 144 | —CN | —NO₂ | —C₆H₅ | —CO— | —CH₃ | 2,2,4-tri-CH₃ | —CH₂CH₂CN |
| 145 | —CN | —NO₂ | —C₆H₅ | —CO— | —CH₃ | 2-CH₃ | —(CH₂)₃SO₂CH₃ |
| 146 | —CN | —NO₂ | —C₆H₅ | —CO— | —CH₃ | 2-CH₃ | —C₅H₁₁ |
| 147 | —CN | —NO₂ | —C₆H₅ | —CO— | —CH₃ | 2,2,4-tri-CH₃ | —CH₂C₆H₅ |
| 148 | —CN | —NO₂ | —C₆H₅ | —CO— | —CH₃ | 2,2,4-tri-CH₃ | —CH₂C₆H₄—p-COOCH₃ |
| 149 | —CN | —NO₂ | —C₆H₅ | —CO— | —CH₃ | 2,2,4-tri-CH₃ | —CH₂C₆H₅ |
| 150 | —CN | —NO₂ | —C₆H₅ | —CO— | —CH₃ | 2,2,4-tri-CH₃ | —CH₂C₆H₅ |
| 151 | —CN | —NO₂ | —C₆H₅ | —CO— | —CH₃ | 2,2,4-tri-CH₃ | —CH₂CH₂OC₆H₅ |
| 152 | —CN | —NO₂ | —C₆H₅ | —CO— | —CH₃ | 2,2,4-tri-CH₃ | —CH₂C₆H₄—p-CH₃ |
| 153 | —CN | —NO₂ | —C₆H₅ | —CO— | —CH₃ | 2,2,4-tri-CH₃ | —CH₂CH₂NHCOCH₃ |
| 154 | —CN | —NO₂ | —C₆H₅ | —CO— | —CH₃ | 2,2,4-tri-CH₃ | —CH₂C₆H₄—p-CH₃ |
| 155 | —CN | —NO₂ | —C₆H₅ | —CO— | —CH₃ | 2,2,4-tri-CH₃ | —CH₂CH₂OOCNHC₆H₅ |
| 156 | —CN | —NO₂ | —C₆H₅ | —CO— | —CH₃ | 2,2,4-tri-CH₃ | —CH₂CH₂OOCNHC₂H₅ |
| 157 | —CN | —NO₂ | —C₆H₅ | —CO— | —CH₃ | 2,2,4-tri-CH₃ | —CH₂CH₂SO₂C₆H₅ |
| 158 | —CN | —SO₂CH₃ | —C₆H₅ | —CO— | —CH₃ | 2,2,4-tri-CH₃ | —CH₂CH₂OH |
| 159 | —CN | —SO₂CH₂CH₂OH | —C₆H₅ | —CO— | —CH₃ | 2-CH₃ | —CH₂CH(OH)CH₂OH |
| 160 | —CN | —SO₂C₂H₅ | —C₆H₅ | —CO— | —CH₃ | 2-CH₃ | —CH₂CH(OH)(OOCCH₃)CH₂OOCCH₃ |
| 161 | —CN | —COOC₂H₅ | —C₆H₅ | —CO— | —CH₃ | 2-CH₃ | —(CH₂)₃OH |
| 162 | —CN | —COOCH₃ | —C₆H₅ | —CO— | —CH₃ | 2-CH₃ | —CH₃CH(OH)CH₂OCH₃ |
| 163 | —CN | —COOCH₂CH₂OH | —C₆H₅ | —CO— | —CH₃ | 2-CH₃ | —CH₃CH(OH)CH₂OCH₃ |
| 164 | —CN | —CON(C₂H₅)₂ | —C₆H₅ | —CO— | —CH₃ | 2-CH₃ | —CH₃CH₂NHSO₂CH₃ |
| 165 | —CN | —CN | —C₆H₅ | —CO— | —CH₃ | 2,2,4-tri-CH₃ | —C₅H₁₁ |
| 166 | —CN | —SO₂CH₃ | —C₆H₅ | —CO— | —CH₃ | 2,2,4-tri-CH₃ | —CH₂CH₂OOCCH₃ |
| 167 | —CN | —NO₂ | —C₆H₅ | —CO— | —CH₃ | 2,2,4-tri-CH₃ | —C₂H₅ |
| 168 | —CN | —NO₂ | —C₆H₅ | —CO— | —CH₃ | 2,2,4-tri-CH₃ | —C₂H₅ |
| 169 | —SO₂CH₃ | —NO₂ | —C₆H₅ | —CO— | —CH₃ | 2,2,4-tri-CH₃ | —C₂H₅ |
| 170 | —SO₂CH₃ | —NO₂ | —C₆H₅ | —CO— | —CH₃ | 2,2,4-tri-CH₃ | —C₂H₅ |
| 171 | —CF₃ | —NO₂ | —C₆H₅ | —CO— | —CH₃ | 2,2,4-tri-CH₃ | —CH₂CH₂OOCCH₃ |
| 172 | —SO₂C₂H₅ | —NO₂ | —C₆H₅ | —CO— | —CH₃ | 2,2,4-tri-CH₃ | —C₂H₅ |
| 173 | —CN | —NO₂ | —C₆H₅ | —CO— | —CH₃ | 2,2,4-tri-CH₃ | —CH₂CH₂OOCCH₃ |
| 174 | —CN | —NO₂ | —C₆H₅ | —CO— | —CH₃ | 2,2,4-tri-CH₃ | —CH₂CH₂OOCCH₃ |
| 175 | —SO₂CH₃ | —NO₂ | —C₆H₅ | —CO— | —CH₃ | 2,2,4-tri-CH₃ | —CH₂CH₂OOCCH₃ |
| 176 | —SO₂C₆H₅ | —NO₂ | —C₆H₅ | —CO— | —CH₃ | 2,2,4-tri-CH₃ | —CH₂CH₃ |
| 177 | —CON(C₂H₅)₂ | —NO₂ | —C₆H₅ | —CO— | —CH₃ | 2,2,4-tri-CH₃ | —C₂H₅ |
| 178 | —SO₂N(C₂H₅)₂ | —NO₂ | —C₆H₅ | —CO— | —CH₃ | 2,2,4-tri-CH₃ | —CH₂CH₃ |
| 179 | —CN | —NO₂ | —C₆H₅ | —CO— | —CH₃ | 2,2,4-tri-CH₃ | —CH₂CH₃ |
| 180 | —SO₂N(C₂H₅)₂ | —NO₂ | —C₆H₅ | —CO— | —CH₃ | 2,2,4-tri-CH₃ | —CH₂CH₃ |
| 181 | —CN | —NO₂ | —C₆H₅ | —CO— | —CH₃ | 2,2,4-tri-CH₃ | —CH₂CH(OH)CH₂Cl |
| 182 | —CN | —NO₂ | —C₆H₅ | —CO— | —CH₃ | 2,2,4-tri-CH₃ | —CH₂CH₂NCOCH₂CH₂CO | ml. of a 25 percent solution of natural gums (Superclear 8ON), and sufficient water to bring the volume to 100 ml. The thickener and penetrating mixture is added to the dye paste, the volume is adjusted to 200 ml. and the mixture is agitated for 15 minutes. The dye mixture is then filtered through folded cheesecloth to remove the stainless steel balls and it then is added to the resevoir of a Butterworth padder where it is heated to about 45°-60°C.

10 g. of a fabric of poly(ethylene terephthalate) fibers and 10 g. of a fabric of 65/35 spun poly(ethylene terephthalate)/cotton fibers are sewn together, end-to-end, and padded for 5 minutes of continuous cycling through the dye mixture and between three rubber squeeze rollers of the padder. Dye mixture pick-up is about 60 percent based on the weight of the fabrics. The padded fabrics are then dried at 200°F. and then heat-fixed for 2 minutes at 415°F. in a forced air oven. The dyed fabrics are scoured for 20 minutes at 65°-70°C. in a solution containing 0.2 percent sodium hydrosulfite, 0.2 percent sodium carbonate and 1.7 percent of a 3 percent solution of sodium N-methyl-N-oleoyltaurate and then dried. The dyed fabric possesses excellent brightness and fastness to light and sublimation when tested according to the procedures described in the 1968 edition of the Technical Manual of the American Association of Textile Chemists and Colorists.

The heat fixation dyeing procedure described above can be varied by the substitution of other dispersing agents, surfactants, suspending agents, thickeners, etc. The temperature and time of the heat-fixation step can also be varied.

Polymeric linear polyester materials of the terephthalate sold under the trademarks "Kodel", "Dacron" and "Terylene" are illustrative of the linear aromatic polyester textile materials that can be dyed with the compounds of our invention. Examples of linear polyester textile materials that can be dyed with the compounds of the invention are those prepared from ethylene glycol and dimethylterephthalate or from cyclohexanedimethanol and dimethylterephthalate. Polyesters prepared from cyclohexanedimethanol and dimethylterephthalate are more particularly described in U.S. Pat. No. 2,901,446. Poly(ethylene terephthalate) polyester fibers are described, for example, in U.S. Pat. No. 2,465,319. The polymeric linear polyester materials disclosed in U.S. Pat. Nos. 2,945,010; 2,957,745 and 2,989,363, for example, can be dyed. The linear aromatic polyester materials specifically named have a melting point of at least 200°C. The poly(ethylene terephthalate) fibers which are dyed with the compounds of the invention are manufactured from a melt of a polymer having an inherent viscosity of at least 0.35 and preferably, about 0.6. The inherent viscosity of the poly(1,4-cyclohexylenedimethylene terephthalate) polymer is also at least 0.35. These inherent viscosities are measured at 25°C. using 0.25 g. polymer per 100 ml. of a solvent consisting of 60 percent phenol and 40 percent tetrachloroethane. The polyester fabrics, yarns, fibers and filaments that are dyed with the novel azo compounds can also contain minor amounts of other additives such as brighteners, pigments, delusterants, inhibitors, stabilizers, etc. Although the azo compounds of the invention are particularly suitable for dyeing polyester textile materials, they can also be used to dye other hydrophobic textile materials such as cellulose acetate and polyamide fibers.

The invention has been described in considerable detail with particular reference to preferred embodiments thereof, but it will be understood that variations and modifications can be effected within the spirit and scope of the invention.

We claim:

1. A compound having the formula

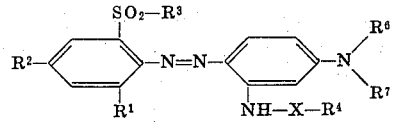

wherein $R^1$ is nitro, cyano, lower alkylsulfonyl, $R^3$—$SO_2$—, trifluoromethyl, lower alkoxycarbonyl, carbamoyl, lower alkylcarbamoyl, di-lower alkylcarbamoyl, sulfamoyl, lower alkylsulfamoyl, or di-lower alkylsulfamoyl;

$R^2$ is nitro, cyano, lower alkylsulfonyl, $R^3$—$SO_2$—, lower alkoxycarbonyl, aroyl, carbamoyl, lower alkylcarbamoyl, di-lower alkylcarbamoyl, or arylazo;

$R^3$ is aryl;

X is —CO—, —COO—, or —$SO_2$—;

$R^4$ is lower alkyl; lower alkyl substituted with halogen, phenyl, cyano, lower alkoxy, lower alkylsulfonyl, hydroxy, lower alkylthio, lower alkanoyloxy, lower alkanoylamino, N-lower alkyl-lower alkylsulfonamido, lower alkanoyl, or cyclohexyl; cyclohexyl; lower alkylcyclohexyl; aryl; lower alkylamino; di-lower alkylamino or; arylamino;

$R^5$ is hydrogen, lower alkyl, lower alkoxy, aryloxy, lower alkylthio, or arylthio;

$R^6$ is alkyl of from one to about eight carbon atoms; lower alkyl substituted with hydroxy, cyano, lower alkoxy, lower cyanoalkoxy, aryl, aryloxy, arylcarbamoyloxy, alkylcarbamoyloxy, cyclohexyl, lower alkylcyclohexyl, carbamoyl, $R^4$—X—, $R^4$—X—NH—, $R^4$—OOCO—, or $R^4$—COO—; cyclohexyl; or lower alkylcyclohexyl; and $R^7$ is hydrogen or an alkyl radical conforming to the definition of $R^6$;

wherein each aryl group is phenyl or phenyl substituted with lower alkyl, lower alkoxy, halogen, nitro, cyano, lower alkanoylamino, or lower alkoxycarbonyl.

2. A compound according to claim 1 having the formula

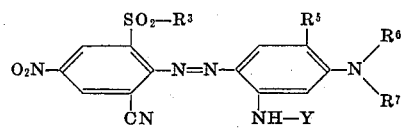

wherein $R^3$ is phenyl, tolyl, or anisyl; Y is lower alkanoyl or, lower alkoxycarbonyl, $R^5$ is hydrogen, methyl, methoxy, or ethoxy;

$R^6$ is alkyl having one to about eight carbon atoms;

lower alkyl substituted with hydroxy, lower alkoxy, lower alkanoyloxy, lower alkylsulfonyl, cyano, phenyl, lower alkanoylamino, lower alkoxycarbonylamino, or lower alkylsulfonamido; or cyclohexyl; and $R^7$ is hydrogen, alkyl having one to about eight carbon atoms, or lower alkyl substituted with hydroxy, lower alkanoyloxy, or lower alkoxy.

3. A compound according to claim 1 having the formula

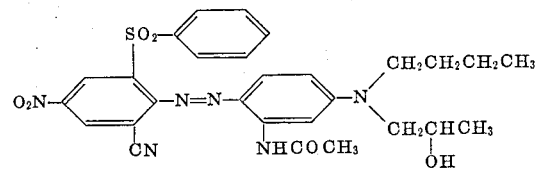

4. A compound according to claim 1 having the formula

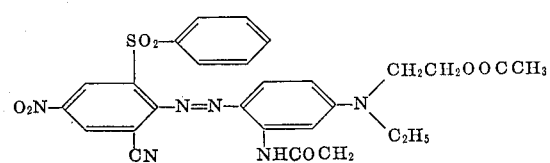

5. A compound according to claim 1 having the formula

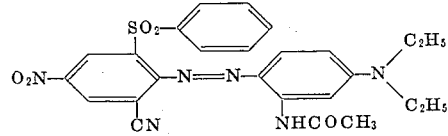

6. A compound according to claim 1 having the formula

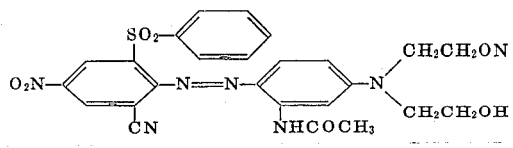

7. A compound according to claim 1 having the formula

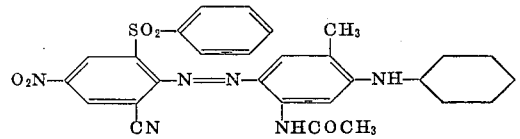

8. A compound according to claim 1 having the formula

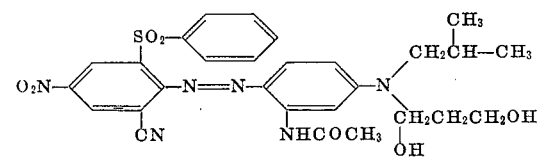

* * * * *

UNITED STATES PATENT OFFICE
CERTIFICATE OF CORRECTION

Patent No. 3,692,769   Dated September 19, 1972

Inventor(s) Max A. Weaver et al

It is certified that error appears in the above-identified patent and that said Letters Patent are hereby corrected as shown below:

On the cover sheet insert -- [73] Assignee

Eastman Kodak Company, Rochester, New York --.

Signed and sealed this 1st day of May 1973.

(SEAL)
Attest:

EDWARD M. FLETCHER, JR.　　　　　　ROBERT GOTTSCHALK
Attesting Officer　　　　　　　　　　Commissioner of Patents

Notice of Adverse Decision in Interference

In Interference No. 98,776 involving Patent No. 3,692,769, M. A. Weaver and J. M. Starley, AZO COMPOUNDS CONTAINING AN ARYLSULFONYL PHENYL DIAZO COMPONENT, final judgment adverse to the patentees was rendered Oct. 20, 1975, as to claims 1, 2 and 5.

*[Official Gazette February 10, 1976.]*